(12) United States Patent
Toyama et al.

(10) Patent No.: US 7,846,542 B2
(45) Date of Patent: Dec. 7, 2010

(54) PRESSURE-SENSITIVE ADHESIVE COMPOSITION FOR OPTICAL FILMS, PRESSURE-SENSITIVE ADHESIVE OPTICAL FILM AND IMAGE DISPLAY

(75) Inventors: Yuusuke Toyama, Osaka (JP); Shinichi Inoue, Osaka (JP); Mizue Nagata, Osaka (JP); Toshisugu Hosokawa, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 58 days.

(21) Appl. No.: 12/370,967

(22) Filed: Feb. 13, 2009

(65) Prior Publication Data

US 2009/0208741 A1 Aug. 20, 2009

(30) Foreign Application Priority Data

Feb. 15, 2008 (JP) ............................. 2008-034653
Jun. 9, 2008 (JP) ............................. 2008-150722

(51) Int. Cl.
*C08F 8/30* (2006.01)
*C08F 8/00* (2006.01)

(52) U.S. Cl. ................................ 428/355 AC; 525/100
(58) Field of Classification Search .................. 428/355
See application file for complete search history.

(56) References Cited

U.S. PATENT DOCUMENTS

2009/0270557 A1* 10/2009 Tomita et al. ............... 525/100

FOREIGN PATENT DOCUMENTS

| EP | 1956064 A1 | 11/2006 |
|---|---|---|
| JP | 62-23287 B2 | 5/1987 |
| JP | 2003-329837 A | 11/2003 |
| JP | 2004-91499 A | 3/2004 |
| JP | 2004-91500 A | 3/2004 |
| JP | 3533589 B2 | 3/2004 |
| JP | 3594206 B2 | 9/2004 |
| JP | 2007-138056 A | 6/2007 |
| JP | 2007-138057 A | 6/2007 |

* cited by examiner

*Primary Examiner*—Ling-Siu Choi
*Assistant Examiner*—Hui Chin
(74) *Attorney, Agent, or Firm*—Westerman, Hattori, Daniels & Adrian, LLP

(57) ABSTRACT

There is provided a pressure-sensitive adhesive composition for optical films. The composition can form a pressure-sensitive adhesive layer that can prevent light leakage caused by stress associated with dimensional change of a component such as an optical film, which include the pressure-sensitive adhesive layer that has reworkability such that it can be easily peeled from a component, and that has satisfactory processability such that it can be processed without pressure-sensitive adhesive stain or dropout, after it is formed on an optical film. A pressure-sensitive adhesive optical film produced using the composition is also provided. The pressure-sensitive adhesive composition includes a (meth)acrylic polymer including (a) 34 to 94% by weight of an alkyl(meth)acrylate monomer unit, (b) 5 to 35% by weight of an aromatic ring-containing (meth)acrylate monomer unit, and (c) 0.01 to 0.5% by weight of an amino group-containing (meth)acrylate monomer unit and further including (d) 0.05 to 3% by weight of a carboxyl group-containing (meth)acrylate monomer unit and/or (e) 0.05 to 2% by weight of a hydroxyl group-containing (meth)acrylate monomer unit and having a weight average molecular weight of 1,600,000 to 3,000,000 as determined by gel permeation chromatography; crosslinking agents including 0.01 to 5 parts by weight of an isocyanate crosslinking agent and 0.01 to 2 parts by weight of a silane coupling agent based on 100 parts by weight of the (meth) acrylic polymer.

7 Claims, No Drawings

PRESSURE-SENSITIVE ADHESIVE COMPOSITION FOR OPTICAL FILMS, PRESSURE-SENSITIVE ADHESIVE OPTICAL FILM AND IMAGE DISPLAY

BACKGROUND OF THE INVENTION

1. Field of the Invention

The present invention relates to a pressure-sensitive adhesive composition required to have durability and light leakage preventive ability for an optical film and to a pressure-sensitive adhesive optical film including an optical film and a pressure-sensitive adhesive layer that is made from the pressure-sensitive adhesive composition on at least one side of the optical film. The invention also relates to an image display such as a liquid crystal display and an organic electroluminescence (EL) display, using the pressure-sensitive adhesive optical film. The optical film may be a polarizing plate, a retardation plate, an optical compensation film, a brightness enhancement film, a laminate thereof, or the like.

2. Description of the Related Art

The image-forming mode of liquid crystal displays or the like essentially requires polarizing elements to be placed on both sides of a liquid crystal cell, and generally polarizing plates are attached thereto. Besides polarizing plates, a variety of optical elements have been used for liquid crystal panels to improve display quality. For example, there are used retardation plates for prevention of discoloration, viewing angle expansion films for improvement of the viewing angle of liquid crystal displays, and brightness enhancement films for enhancement of the contrast of displays. These films are generically called optical films.

When optical members such as the optical films are attached to a liquid crystal cell, pressure-sensitive adhesives are generally used. Bonding between an optical film and a liquid crystal cell or between optical films is generally performed with a pressure-sensitive adhesive in order to reduce optical loss. In such a case, a pressure-sensitive adhesive optical film including an optical film and a pressure-sensitive adhesive layer previously formed on one side of the optical film is generally used, because it has some advantages such as no need for a drying process to fix the optical film.

The pressure-sensitive adhesive is required to have some characteristics. In some cases, for example, if in the process of bonding an optical film to a liquid crystal cell, they are misaligned or foreign matter is caught on the bonding surface, the optical film should be separated from the liquid crystal panel so that the liquid crystal cell can be recycled. For this separation process, the pressure-sensitive adhesive should have re-peelability (reworkability) such that the optical film can be easily peeled from the liquid crystal panel with no adhesive residue. Particularly in recent years, thin liquid crystal panels using chemically-etched glass plates are frequently used together with conventional panel manufacturing processes, and it has become difficult to subject optical films from the thin liquid crystal panels to reworking or processing. The pressure-sensitive adhesive is also required to have processability such that it can be processed without causing adhesive stain or dropout after it is formed. In addition, the pressure-sensitive adhesive is required not to cause any defect in durability tests by heating, moistening and so on, which are generally performed as accelerated environmental tests. Also, the pressure-sensitive adhesive is required to prevent light leakage caused by dimensional change generated in the pressure sensitive adhesive layer in the film.

A conventionally proposed method to solve the problems with the reworkability of liquid crystal panels includes adding a plasticizer or an oligomer component to an acrylic polymer used as a base polymer for an acrylic pressure-sensitive adhesive (see Japanese Patent Application Laid-Open (JP-A) No. 2003-329837). However, such an acrylic pressure-sensitive adhesive cannot provide satisfactory reworkability or processability for the thin liquid crystal panels.

Other than the above, proposed acrylic pressure-sensitive adhesives for optical films include an acrylic pressure-sensitive adhesive including an acrylic polymer produced using alkyl(meth)acrylate, a monomer having a hydroxyl group in the molecule and a monomer having a functional group such as a carboxyl, amide or amino group in the molecule as monomer components (see JP-A No. 2004-091499 and JP-A No. 2004-091500); and a pressure-sensitive adhesive including an acrylic polymer produced using aromatic ring-containing monomer (see Publication of Examined Application No. 62-23287). However, none of these acrylic pressure-sensitive adhesives disclosed in the patent literatures can provide satisfactory reworkability or processability, although they can provide improved durability and adhesiveness.

On the other hands, a pressure-sensitive adhesive composition including plasticizer or oligomers is proposed to prevent light leakage of an image display that is prepared with the use of an optical film (Japanese Patent No. 3594206 and Japanese Patent No. 3533589). However, such a pressure-sensitive adhesive composition cannot provide satisfactory workability and durability.

A pressure-sensitive adhesive composition for improvements in durability and reworkability and remediation of light leakage is proposed, which includes a copolymer of an acrylate eater, an aromatic ring-containing monomer, and a hydroxyl group-containing monomer as a base (see JP-A No. 2007-138057 and JP-A No. 2007-1380560). However, such a copolymer does not have satisfactory durability, because of its low molecular weight and high degree of dispersion. Such a pressure-sensitive adhesive composition is intended to reduce staining or adhesive residue during re-peeling, but it is not easily peelable and therefore not practically satisfactory.

Patent Document 1: Japanese Patent Application Laid-Open (JP-A) No. 2003-329837
Patent Document 2: JP-A No. 2004-091499
Patent Document 3: JP-A No. 2004-091500
Patent Document 4: Publication of Examined Application No. 62-23287
Patent Document 5: Japanese Patent No. 3594206
Patent Document 6: Japanese Patent No. 3533589
Patent Document 7: JP-A No. 2007-138057
Patent Document 8: JP-A No. 2007-138056

SUMMARY OF THE INVENTION

An object of the invention is to provide a pressure-sensitive adhesive composition for optical films (an optical film pressure-sensitive adhesive composition) capable of forming a pressure-sensitive adhesive layer that can prevent light leakage caused by stress associated with dimensional change of a member such as an optical film, that has reworkability such that an optical film can be easily peeled from a liquid crystal panel with no adhesive residue, and that has satisfactory processability such that it can be processed without pressure-sensitive adhesive stain or dropout, after it is formed on an optical film.

Another object of the invention is to provide a pressure-sensitive adhesive optical film including a pressure-sensitive adhesive layer formed from the optical film pressure-sensitive adhesive composition and to provide an image display device with the pressure-sensitive adhesive optical film.

As a result of investigations to solve the problems, the inventors have found the optical film pressure-sensitive adhesive composition described below to complete the invention.

Specifically, the invention is related to a pressure-sensitive adhesive composition for an optical film (an optical film pressure-sensitive adhesive composition), including: a (meth) acrylic polymer including (a) 34 to 94% by weight of an alkyl(meth)acrylate monomer unit, (b) 5 to 35% by weight of an aromatic ring-containing (meth)acrylate monomer unit, and (c) 0.01 to 0.5% by weight of an amino group-containing (meth)acrylate monomer unit, and further including (d) 0.05 to 3% by weight of a carboxyl group-containing (meth)acrylate monomer unit and/or (e) 0.05 to 2% by weight of a hydroxyl group-containing (meth)acrylate monomer unit and having a weight average molecular weight of 1,600,000 to 3,000,000 as determined by gel permeation chromatography; crosslinking agents including 0.01 to 5 parts by weight of an isocyanate crosslinking agent and 0.01 to 2 parts by weight of a silane coupling agent based on 100 parts by weight of the (meth)acrylic polymer.

In the pressure-sensitive adhesive composition for an optical film, the (meth)acrylic polymer preferably has a degree of dispersion (Mw/Mn) of 1 to 10.

In the pressure-sensitive adhesive composition for an optical film, the amino group-containing (meth)acrylate is preferably a tertiary amino group-containing (meth)acrylate.

In the pressure-sensitive adhesive composition for an optical film, the isocyanate crosslinking agent is preferably a polyisocyanate compound derived from hexamethylene diisocyanate.

In the pressure-sensitive adhesive composition for an optical film, the silane coupling agent preferably has an acetoacetyl group or an amino group.

In the pressure-sensitive adhesive composition for an optical film, the aromatic ring-containing (meth)acrylate is preferably at least one selected from the group consisting of phenoxyethyl(meth)acrylate and benzyl(meth)acrylate.

In the pressure-sensitive adhesive composition for an optical film, the phenoxyethyl(meth)acrylate preferably makes up 5 to 20% by weight of all the monomers constituting the (meth)acrylic polymer.

The invention is also related to a pressure-sensitive adhesive layer for an optical film, including: a product obtained by forming a coating of any of the optical film pressure-sensitive adhesive compositions stated above and subjecting the coating to a crosslinking reaction, wherein the coating has a gel fraction of 55 to 95% and a refractive index of less than 1.50 one hour after the formation of the coating.

In the pressure-sensitive adhesive layer for an optical film, the coating preferably has a gel fraction of 60 to 95% one week after the formation of the coating.

The invention is also related to a pressure-sensitive adhesive optical film, including: an optical film; and any of the above optical film pressure-sensitive adhesive layers formed on at least one side of the optical film.

In the pressure-sensitive adhesive optical film, the pressure-sensitive adhesive layer preferably has a holding power (H) of 20 to 350 μm one week after the formation of the pressure-sensitive adhesive layer.

The pressure-sensitive adhesive optical film preferably shows an adhesive force (F1) of 1 N/25 mm to 10 N/25 mm, when it is peeled at a peel angle of 90° and a peel rate of 300 mm/minute after the steps of making it 25 mm wide, bonding it to a alkali-free glass plate through the pressure-sensitive adhesive layer by one reciprocation of a 2 kg roller, and allowing it to stand at 23° C. for one hour.

The pressure-sensitive adhesive optical preferably shows an adhesive force (F2) of 2 N/25 mm to 15 N/25 mm, when it is peeled at a peel angle of 90° and a peel rate of 300 mm/minute after the steps of making it 25 mm wide, bonding it to a alkali-free glass plate through the pressure-sensitive adhesive layer by one reciprocation of a 2 kg roller, and allowing it to stand at 23° C. for one hour and then dried at 60° C. for 48 hours.

The invention is also related to an image display device including at least one piece of any of the above pressure-sensitive adhesive optical films.

The optical film pressure-sensitive adhesive composition of the invention includes, as a base polymer, a (meth)acrylic polymer in which an alkyl(meth)acrylate monomer and an aromatic ring-containing (meth)acrylate are copolymerized in an adequate ratio. This feature prevents light leakage from an optical member produced with the optical film pressure-sensitive adhesive composition. The optical film pressure-sensitive adhesive composition of the invention also provides improved processability and reworkability and prevents pressure-sensitive adhesive dropout or staining during working processes. The optical film pressure-sensitive adhesive composition of the invention also allows easy peeling with no adhesive residue in the process of peeling optical films from thin liquid crystal panels, especially from liquid crystal panels using chemically-etched glass plates.

The amino group-containing (meth)acrylate monomer unit present in a small amount in the (meth)acrylic polymer can improve the stability of the crosslink in the pressure-sensitive adhesive layer after the pressure-sensitive adhesive layer is formed by a crosslinking reaction with the crosslinking agent.

The carboxyl group-containing (meth)acrylate monomer unit and/or the hydroxyl group-containing (meth)acrylate monomer unit present in the (meth)acrylic polymer of the optical film pressure-sensitive adhesive composition of the invention also provides improved durability and improved reworkability. The (meth)acrylic polymer including a carboxyl group-containing (meth)acrylate or a hydroxyl group-containing (meth)acrylate as a copolymerized component can provide improved reworkability and improved durability based on the acid-base interaction or the hydrogen bonding of the copolymerized component. It is considered that such improvements make it possible to prevent defects such as peeling off and separation of the pressure-sensitive adhesive under heating or humidifying conditions.

The pressure-sensitive adhesive composition of the invention including the prescribed amount of an isocyanate compound as a crosslinking agent has improved rapid crosslinkability. Specifically, in this case, an aging process after coating may also be omitted. In addition, a silane coupling agent is used within the prescribed range as another crosslinking agent. When the isocyanate compound is used in combination with the silane coupling agent, the crosslink stability can be particularly improved so that the reworkability and the processability can be improved. The pressure-sensitive adhesive also imparts resistance to damage of panels or rupture of films, when optical members are produced using it and when the produced optical members are used.

DETAILED DESCRIPTION OF THE PREFERRED EMBODIMENTS

As described below, the optical film pressure-sensitive adhesive composition of the invention includes the monomer units (a) to (c) and further includes either one or both of the monomer units (d) and (e). Specifically, it includes, as a base polymer, a (meth)acrylic polymer including 34 to 94% by weight of (a) an alkyl(meth)acrylate monomer unit, (b) 5 to 35 parts by weight of an aromatic ring-containing (meth)acrylate monomer unit, and (c) 0.01 to 0.5% by weight of an amino group-containing (meth)acrylate monomer unit and further includes (d) 0.05 to 3% by weight of a carboxyl group-containing (meth)acrylate monomer unit and/or (e) 0.05 to 2% by weight of a hydroxyl group-containing (meth)acrylate monomer unit.

As used herein, the term "alkyl(meth)acrylate" itself simply refers to a (meth)acrylate having a straight or branched chain alkyl group of 2 to 18 carbon atoms, which is exclusive of any alkyl(meth)acrylate having an aromatic ring or rings in its structure. The alkyl group preferably has an average number of carbon atoms of 2 to 14, more preferably of 3 to 12, still more preferably of 4 to 9. As used herein, the term "(meth) acrylate" refers to acrylate and/or methacrylate, and has the same meaning as "meth" with respect to the invention.

Examples of alkyl(meth)acrylate include ethyl(meth)acrylate, n-butyl(meth)acrylate, sec-butyl(meth)acrylate, tert-butyl(meth)acrylate, isobutyl(meth)acrylate, n-pentyl(meth) acrylate, isopentyl(meth)acrylate, hexyl(meth)acrylate, heptyl(meth)acrylate, isoamyl(meth)acrylate, 2-ethylhexyl (meth)acrylate, n-octyl(meth)acrylate, isooctyl(meth)acrylate, n-nonyl(meth)acrylate, isononyl(meth)acrylate, n-decyl (meth)acrylate, isodecyl(meth)acrylate, n-dodecyl(meth) acrylate, isomyristyl (meth)acrylate, n-tridecyl(meth) acrylate, n-tetradecyl(meth)acrylate, stearyl(meth)acrylate, and isostearyl(meth)acrylate. In particular, n-butyl(meth) acrylate and 2-ethylhexyl(meth)acrylate are preferred, and one or more of these materials may be used alone or in combination.

As used herein, the content of the alkyl(meth)acrylate (a) is from 34 to 94% by weight, preferably from 50 to 90% by weight, more preferably from 70 to 84% by weight, based on the total amount of all the monomer components for the (meth)acrylic polymer. If the content of the (meth)acrylic monomer is too low, the adhesion would be undesirably reduced. The content of the monomer (a) and the content of the aromatic ring-containing (meth)acrylate should be balanced.

As used herein, the term "aromatic ring-containing (meth) acrylate" refers to a copolymerizable (meth)acrylate having an aromatic group or groups in its structure. Examples of the aromatic ring-containing (meth)acrylate (b) include phenyl acrylate, phenoxy(meth)acrylate, phenoxyethyl(meth)acrylate, benzyl(meth)acrylate, phenoxydiethylene glycol(meth) acrylate, ethylene oxide-modified nonylphenol(meth)acrylate, hydroxyethylated β-naphthol acrylate, and biphenyl (meth)acrylate. Examples thereof also include phenol ethylene oxide-modified (meth)acrylate, 2-naphthoethyl (meth)acrylate, 2-naphthoxyethyl acrylate, 2-(4-methoxy-1-naphthoxy)ethyl(meth)acrylate, phenoxypropyl(meth)acrylate, phenoxydiethylene glycol(meth)acrylate, thiol acrylate, pyridyl acrylate, pyrrole acrylate, phenyl acrylate, and polystyryl(meth)acrylate.

As used herein, the content of the aromatic ring-containing (meth)acrylate (b) is from 5 to 35% by weight, preferably from 10 to 30% by weight, more preferably 15 to 28% by weight, based on the total amount of all the monomer components for the (meth)acrylic polymer. The content of the aromatic ring-containing (meth)acrylate and the content of the alkyl(meth)acrylate should be balanced.

As used herein, examples of the amino group-containing (meth)acrylate (c) include monomers other than tertiary amino group-containing (meth)acrylates, such as succinimide-based monomers such as N-(meth)acryloyloxymethylenesuccinimide, N-(meth)acryloyl-6-oxyhexamethylenesuccinimide, and N-(meth)acryloyl-8-oxyoctamethylenesuccinimide; N-substituted amide monomers such as (meth)acrylamide, N,N-dimethyl(meth) acrylamide, N,N-diethyl(meth)acrylamide, N,N-diethylmethacrylamide, N-isopropyl(meth)acrylamide, N-methylol (meth)acrylamide, N-methoxymethyl(meth)acrylamide, and N-butoxymethyl(meth)acrylamide; secondary amino group-containing monomers such as tert-butylaminoethyl(meth) acrylate; and diacetone(meth)acrylamide, N,N'-methylenebis(meth)acrylamide, N-acryloylmorpholine, N-acryloylpiperidine, N-methacryloylpiperidine, and N-acryloylpyrrolidine. However, tertiary amino group-containing (meth)acrylates are particularly preferred. Monomers having various tertiary amino groups and (meth)acryloyl groups are preferably used. The tertiary amino group is preferably tertiary amino alkyl. The tertiary amino group-containing (meth)acrylate may be N,N-dialkylaminoalkyl(meth) acrylamide or N,N-dialkylaminoalkyl (meth)acrylate. Examples of the tertiary amino group-containing (meth)acrylate include N,N-dimethylaminoethyl(meth)acrylamide, N,N-dimethylaminopropyl(meth)acrylamide, N,N-diethylaminoethyl(meth)acrylamide, N,N-diethylaminopropyl (meth)acrylamide, N,N-dimethylaminoethyl(meth)acrylate, N,N-dimethylaminopropyl(meth)acrylate, N,N-diethylaminoethyl(meth)acrylate, and N,N-diethylaminopropyl(meth) acrylamide.

The amino group-containing (meth)acrylate is used in an amount of 0.01 to 0.5% by weight based on the total amount of the monomer components used to form the (meth)acrylic polymer. The content of the amino group-containing (meth) acrylate is preferably from 0.01 to 0.3% by weight, more preferably from 0.05 to 0.15% by weight. If the content of the amino group-containing (meth)acrylate is less than 0.01% by weight, the pressure-sensitive adhesive layer can have poor crosslink stability so that satisfactory reworkability or processability cannot be achieved. Such a content is also not preferred in view of durability. On the other hand, in view of reworkability, the content of the amino group-containing (meth)acrylate should not be too high and is controlled to be 0.5% by weight or less.

Any carboxyl group-containing (meth)acrylate having a carboxyl group and a polymerizable functional group with a (meth)acryloyl unsaturated double bond may be used without any particular limitations. Examples of the carboxyl group-containing (meth)acrylate include (meth)acrylic acid, carboxyethyl(meth)acrylate, and carboxypentyl(meth)acrylate.

The carboxyl group-containing (meth)acrylate may be used in an amount of 0.05 to 3% by weight, as needed, based on the total amount of the monomer components forming the (meth)acrylic polymer. The content of the carboxyl group-containing (meth)acrylate is preferably from 0.05 to 2% by weight, more preferably from 0.1 to 1% by weight. In order to improve durability, the content of the carboxyl group-containing (meth)acrylate is preferably 0.05% by weight or more. On the other hand, if the content of the carboxyl group-containing (meth)acrylate is more than 3% by weight, the adhering strength can be undesirably high so that peel strength can be too high to provide satisfactory reworkability.

Any hydroxyl group-containing (meth)acrylate having a hydroxyl group and a polymerizable functional group having a (meth)acryloyl group unsaturated double bond may be used without any particular limitations. Examples of the hydroxyl group-containing (meth)acrylate include hydroxyalkyl (meth)acrylates such as 2-hydroxyethyl(meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)

acrylate, and 12-hydroxylauryl(meth)acrylate; hydroxyethyl (meth)acrylamide, and others, such as (4-hydroxymethylcyclohexyl)methyl acrylate, N-methylol (meth)acrylamide, and N-hydroxy(meth)acrylamide.

The hydroxyl group-containing (meth)acrylate may be used in an amount of 0.05 to 2% by weight, based on the total amount of the monomer components forming the (meth) acrylic polymer. The content of the hydroxyl group-containing (meth)acrylate is preferably from 0.05 to 1.5% by weight, more preferably from 0.1 to 1% by weight. In order to improve durability, the content of the hydroxyl group-containing (meth)acrylate is preferably 0.05% by weight or more. Particularly when an isocyanate crosslinking agent is used, the content of the hydroxyl group-containing (meth)acrylate is preferably 0.06% by weight or more in order to ensure crosslinking points with the isocyanate group. On the other hand, if the content of the hydroxyl group-containing (meth)acrylate monomer is too high, the adhering strength can be undesirably high so that peeling can be too low to provide satisfactory reworkability.

Any monomer component other than the monomers described above may be used in an amount of not more than 45% by weight of the total amount of the monomers forming the (meth)acrylic polymer, as long as it does not impair the purposes of the invention. The content of any other monomer is more preferably 40% by weight or less. Examples of such any other monomer include acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamide-2-methylpropanesulfonic acid, (meth)acrylamidepropanesulfonic acid, sulfopropyl (meth)acrylate, and (meth)acryloyloxynaphthalenesulfonic acid; phosphate group-containing monomers such as 2-hydroxyethylacryloyl phosphate; and alkoxyalkyl(meth)acrylate monomers such as methoxyethyl(meth)acrylate and ethoxyethyl(meth)acrylate.

Examples of additional monomers that may be used include vinyl monomers such as vinyl acetate, vinyl propionate, styrene, α-methylstyrene, and N-vinylcaprolactam; epoxy group-containing acrylic monomers such as glycidyl (meth)acrylate; glycol acrylate monomers such as polyethylene glycol(meth)acrylate, polypropylene glycol(meth)acrylate, methoxyethylene glycol(meth)acrylate, and methoxypolypropylene glycol(meth)acrylate; and (meth) acrylate ester-based monomers such as tetrahydrofurfuryl (meth)acrylate, fluoro(meth)acrylate, silicone(meth)acrylate, and 2-methoxyethyl acrylate.

A copolymerizable monomer other than the above, such as a silane monomer having a silicon atom may also be used. Examples of the silane monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In an embodiment of the invention, a (meth)acrylic polymer with a weight average molecular weight of 1,600,000 to 3,000,000 is used in view of durability, particularly heat resistance. The (meth)acrylic polymer to be used preferably has a weight average molecular weight of 1,800,000 to 2,800,000, more preferably of 2,000,000 to 2,600,000. A weight average molecular weight of less than 1,600,000 is not preferred in view of heat resistance. Too high weight average molecular weight can reduce the bonding properties or the adhesive strength and thus is not preferred. The weight average molecular weight refers to values measured by gel permeation chromatography (GPC) and calculated by converting the weight average molecular weight in terms of polystyrene.

In an embodiment of the invention, the (meth)acrylic polymer should have a degree of dispersion between its weight average molecular weight (Mw) and the number average molecular weight (Mn)) in the range of 1 to 10. In view of durability, particularly heat resistance, the degree of dispersion is particularly preferably from 1 to 8, more preferably from 1.5 to 7, still more preferably from 2 to 6. If the degree of dispersion is too high, the content of low molecular weight polymers can increase so that defects such as foaming could easily occur in a heating test.

For the production of the (meth)acrylic polymer, any appropriate method may be selected from known production methods such as solution polymerization, bulk polymerization, emulsion polymerization, and various radical polymerization methods. The resulting (meth)acrylic polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acrylic polymer may be controlled by the amount of addition of the polymerization initiator or the chain transfer agent or by the reaction conditions. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth) acrylic polymer with the above weight average molecular weight, the polymerization initiator is preferably used in a content of from about 0.06 to 0.2 parts by weight, more preferably of from about 0.08 to 0.175 parts by weight, based on 100 parts by weight of the total content of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total content of the chain transfer agent is preferably 0.1 parts by weight or less, based on 100 parts by weight of the total content of the monomer components.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by ADEKA CORPORATION). The reactive emulsifier is preferred, because after polymerization, it can be incorporated into a polymer chain to improve water resistance. Based on 100 parts by weight of the total monomer component, the emulsifier is preferably used in a content of 0.3 to 5 parts by weight, more preferably of 0.5 to 1 parts by weight, in view of polymerization stability or mechanical stability.

The pressure-sensitive adhesive composition of the present invention also includes a isocyanate compound as a crosslinking agent. Examples of the isocyanate compounds include: isocyanate monomers such as tolylene diisocyanate; chlorophenylene diisocyanate, tetramethylene diisocyanate, isophorone diisocyanate; xylylene diisocyanate, diphenylmethane diisocyanate, hydrogenated diphenylmethane diisocyanate, and adduct type isocyanate compounds obtained by adding the isocyanate monomer to a polyhydroxy alcohol, for example trimethylolpropane; and urehthane prepolymer type isocyanates obtained by addition reaction of an isocyanurate compound, a burette type compound, in addition thereto a known polyether polyol, a known polyester polyol, a acryl polyol, a polybutadiene polyol, a polyisoprene polyol and the like. The polyisocyanate compound is particularly preferred and at least one selected from the group consisting of hexamethylene diisocyanate, hydrogenated xylylene diisocyanate, and isophorone diisocyanate, or a polyisocyanate compound derived therefrom. Examples of one selected from the group consisting of hexamethylene diisocyanate, hydrogenated xylylene diisocyanate, and isophorone diisocyanate, or the polyisocyanate compound derived therefrom include hexamethylene diisocyanate, hydrogenated xylylene diisocyanate, isophorone diisocyanate, polyol-modified hexamethylene diisocyanate, polyol-modified hydrogenated xylylene diisocyanate, trimer type hydrogenated xylylene diisocyanate, and polyol-modified isophorone diisocyanate. The polyisocyanate compounds listed above are preferred, because they can rapidly react with the hydroxyl group and particularly contribute to rapid crosslinking, in which specifically an acid or a base contained in the polymer can act like a catalyst.

One or more of the isocyanate crosslinking agents may be used alone or in combination. The total content of the isocyanate crosslinking agent is preferably from 0.01 to 5 parts by weight, more preferably from 0.02 to 3 parts by weight, even more preferably from 0.05 to 1.5 parts by weight, based on 100 parts by weight of the (meth)acrylic polymer. A content of less than 0.01 parts by weight could provide insufficient cohesion and thus is not preferred. A content of more than 5 parts by weight may tend to cause peeling in a durability test and thus is not preferred.

A silane coupling agent may also be used for the pressure-sensitive adhesive composition for use in the present invention in order to increase adhesive strength or durability. Any appropriate known silane coupling agent may be used.

Examples of silane coupling agents include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, 3-triethoxysilyl-N-(1,3-dimethylbutylidene)propylamine and N-phenyl-γ-aminopropyl trimethoxysilane; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane. Such silane coupling agents are preferably used to increase durability. However, other silane coupling agents can also be used to increase durability.

The silane coupling agent may be used alone, or two or more thereof may be used in a mixture. The total content of the silane coupling agent is preferably from 0.01 to 2 parts by weight, more preferably from 0.02 to 1 parts by weight, still more preferably from 0.05 to 0.6 parts by weight, based on 100 parts by weight of the (meth)acrylic polymer. Such content is preferable to improve durability and maintain adhesiveness to optical parts such as liquid crystal cells.

The pressure-sensitive adhesive composition of the present invention also includes a peroxide.

In the present invention, any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used.

Examples of the peroxide for use in the present invention include di(2-ethylhexyl)peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.30° C.), dilauroyl peroxide (one-minute half-life temperature: 116.4° C.), di-n-octanoylperoxide (one-minute half-life temperature: 117.40° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl)peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

One or more of the peroxides may be used alone or in combination. The total content of the peroxide is from 0.01 to 2 parts by weight, preferably from 0.04 to 1.5 parts by weight, more preferably from 0.05 to 1 part by weight, based on 100 parts by weight of the (meth)acrylic polymer. To adjust processability, reworkability, crosslink stability, and releasability, the content can be optionally selected.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

An organic crosslinking agent or a polyfunctional metal chelate may also be used as the crosslinking agent. Examples of the organic crosslinking agent include epoxy crosslinking agents, and imine crosslinking agents. The polyfunctional metal chelate may comprise a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

When the pressure-sensitive adhesive layer is formed, not only the control of the amount of addition of these agents but also the effect of the crosslinking temperature or the crosslinking time should be well taken into account.

The crosslinking temperature and the crosslinking time can be controlled depending on the type of the crosslinking agent to be used. The crosslinking temperature is preferably 170° C. or lower.

The crosslinking process may be performed at the temperature where the process of drying the pressure-sensitive adhesive layer is performed, or an independent crosslinking process may be performed after the drying process.

The crosslinking time is generally from about 0.2 to about 20 minutes, preferably from about 0.5 to about 10 minutes, while it can be determined in view of productivity or workability.

The pressure-sensitive adhesive composition of the present invention may also contain any other known additive. For example, a powder such as a colorant and a pigment, a dye, a surfactant, a plasticizer, a tackifier, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

The pressure-sensitive adhesive optical film of the present invention includes an optical film and a pressure-sensitive adhesive layer that is formed from the pressure-sensitive adhesive on at least one side of the optical film.

For example, the pressure-sensitive adhesive layer may be formed by a method that includes applying the pressure-sensitive adhesive composition to a release-treated separator or the like, removing polymerization solvents and so on by drying and curing the composition to form a pressure-sensitive adhesive layer, and then transferring the pressure-sensitive adhesive layer onto an optical film. Alternatively, the pressure-sensitive adhesive layer may be formed by a method that includes directly applying the pressure-sensitive adhesive composition to an optical film serving as the base material and removing polymerization solvents and so on by drying and curing the composition to form a pressure-sensitive adhesive layer on the optical film. Before the pressure-sensitive adhesive is applied, one or more optional solvents other than the polymerization solvents may be further added to the pressure-sensitive adhesive.

A silicone peeling off liner is preferably used as the release-treated separator. The adhesive composition of the invention may be applied to such a liner and dried to form a pressure-sensitive adhesive layer. In this process, any appropriate method may be used for drying the pressure-sensitive adhesive, depending on the purpose. A method of heating and drying the coating film is preferably used. The heating and drying temperature is preferably from 40° C. to 200° C., more preferably from 50° C. to 180° C., particularly preferably from 70° C. to 170° C. When the heating temperature is set within the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, particularly preferably from 10 seconds to 5 minutes.

The surface of the optical film may also be coated with an anchor layer or subjected to any adhesion-facilitating treatment such as corona treatment or plasma treatment, before the pressure-sensitive adhesive layer is formed. The surface of the pressure-sensitive adhesive layer may also be subjected to adhesion-facilitating treatment.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is not limited, but for example, from about 1 to 100 µm, preferably from 2 to 50 µm, more preferably from 2 to 40 µm, still more preferably from 5 to 35 µm.

The resulting pressure-sensitive adhesive layer according to the invention may have a gel fraction of 55 to 95%, preferably of 60 to 95%, more preferably of 70 to 95%, one hour after the coating. The gel fraction falling within such a range means that the crosslinking rate can be high; dents would be less likely to be generated; and the resulting pressure-sensitive adhesive layer can be free from the generation of dents.

The resulting pressure-sensitive adhesive layer according to the invention may have a gel fraction of 60 to 95%, preferably of 65 to 95%, particularly preferably of 70 to 90%, one week after the coating.

In general, when the gel fraction is too high or low, durability can often be insufficient. If the gel fraction is too high, the pressure-sensitive adhesive layer can fail to withstand the dimensional change of the optical film due to shrinkage or expansion particularly under heating conditions so that a defect such as peeling off from a liquid crystal cell could easily occur. If the gel fraction is too low, a defect such as foaming between a liquid crystal cell and the pressure-sensitive adhesive layer could easily occur particularly under heating conditions.

The resulting pressure-sensitive adhesive layer according to the invention should have a refractive index of less than 1.5. In order to prevent light leakage from an image display device including the pressure-sensitive adhesive layer-containing optical film, the pressure-sensitive adhesive layer preferably has no birefringence. From this point of view, the refractive index is more preferably less than 1.496, still more preferably less than 1.492.

The pressure-sensitive adhesive layer of the invention preferably has a holding power (H) of 20 to 350 μm, more preferably of 40 to 300 μm, particularly preferably of 50 to 250 μm, after it is applied to a film or the like and allowed to stand at room temperature (23° C.) for one week. If the holding power is too high or low, durability can be insufficient. If the holding power is too low, the pressure-sensitive adhesive layer can fail to withstand the dimensional change of the optical film due to shrinkage or expansion particularly under heating conditions so that a defect such as foaming between a liquid crystal cell and the pressure-sensitive adhesive layer could easily occur.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased. The pressure-sensitive adhesive layer of the present invention is suitable for a release-treated separator and particularly suitable for a separator release-treated with a silicone material.

In the above production method, the release-treated sheet may be used without modification as a separator for the pressure-sensitive adhesive sheet, the pressure-sensitive adhesive optical film or the like, so that the process can be simplified.

The optical film may be of any type for use in forming image displays such as liquid crystal displays. For example, a polarizing plate is exemplified as the optical film. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; polyene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetyl-cellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to 500 µm from the viewpoint of a strength, workability such as handlability, requirement for a thin film and the like. Especially, the thickness is preferably in the range of from 1 to 300 µm and more preferably in the range of from 5 to 200 µm. Therefore, it is particularly preferred that the transparent protective film has a thickness of 5 to 150 µm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly($C_{1-6}$ alkyl(meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

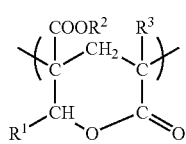

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film may be subjected to surface modification treatment before it is applied with the adhesive to improve adhesiveness to polarizer. Specific examples of such treatment include corona treatment, plasma treatment, ozone treatment, flame treatment, primer treatment, glow treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

Further an optical film of the present invention may be used as other optical layers, such as a reflective plate, a anti-transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other component such as a lighting system and incorporating a driving circuit according to any conventional technique, except that the pressure-sensitive adhesive optical film of the present invention is used. Any type of liquid crystal cell may also be used such as a TN type, an STN type, a π type a VA type and IPS type.

Suitable liquid crystal displays, such as liquid crystal display with which the pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

The pressure-sensitive adhesive optical film of the invention may have an adhering strength as described below. Specifically, the pressure-sensitive adhesive optical film preferably shows an adhering strength (F1) of 1 N/25 mm to 10 N/25 mm, more preferably of 1 N/25 mm to 8.5 N/25 mm, particularly preferably of 2 N/25 mm to 7 N/25 mm, when it is peeled at a peel angle of 90° and a peel rate of 300 mm/minute after the steps of making it 25 mm wide, bonding it to a alkali-free glass plate through the pressure-sensitive adhesive layer by one reciprocation of a 2 kg roller, and allowing it to stand at 23° C. for 1 hour.

The pressure-sensitive adhesive optical film also preferably shows an adhering strength (F2) of 2 N/25 mm to 15 N/25 mm, more preferably of 2 N/25 mm to 12 N/25 mm, particularly preferably of 3 N/25 mm to 10 N/25 mm, when it is peeled at a peel angle of 90° and a peel rate of 300 mm/minute after the steps of making it 25 mm wide, bonding it to a alkali-free glass plate through the pressure-sensitive adhesive layer by one reciprocation of a 2 kg roller, and allowing it to stand at 23° C. for 1 hour and then dried at 60° C. for 48 hours.

EXAMPLE

The invention is more specifically described using the examples below, which are not intended to limit the scope of the invention. In each example, "part or parts" and "%" are all by weight. Unless otherwise specified, standing conditions at room temperature are 23° C. and 65% RH (for 1 hour or 1 week) in each case. The evaluation items in the examples and so on were measured as described below.

Measurement of Weight Average Molecular Weight

The weight average molecular weight of the resulting (meth)acrylic polymer was measured by gel permeation chromatography (GPC). The sample was dissolved in dimethylformamide to form a 0.1% by weight solution. The solution was allowed to stand overnight and then filtered through a 0.45 μm membrane filter, and the resulting filtrate was used under the following conditions: analyzer, HLC-8120GPC manufactured by Tosoh Corporation; column, Super AWM-H, AW4000, AW2500, manufactured by Tosoh Corporation; column size, each 6.0 mmφ×150 mm; eluent, a dimethylformamide solution of 30 mM lithium bromide and 30 mM phosphoric acid; flow rate, 0.4 ml/minute; detector, Refractive index detector (RI); column temperature, 40° C.; injection volume, 20 μl.

Measurement of Number Average Molecular Weight

The number average molecular weight of the resulting (meth)acrylic polymer was also measured and calculated by gel permeation chromatography (GPC) similar to that described above.

Preparation of Polarizing Plate

An 80 μm-thick polyvinyl alcohol film was stretched to 3 times between rolls different in velocity ratio, while it was dyed in a 0.3% iodine solution at 30° C. for 1 minute. The film was then stretched to a total draw ratio of 6 times, while it was immersed in an aqueous solution containing 4% of boric acid and 10% of potassium iodide at 60° C. for 0.5 minutes. The film was then washed by immersion in an aqueous solution containing 1.5% of potassium iodide at 30° C. for 10 seconds and then dried at 50° C. for 4 minutes to give a polarizer. Saponified triacetylcellulose films each with a thickness of 80 μm were bonded to both sides of the polarizer with a polyvinyl alcohol-based adhesive to form a polarizing plate.

Production Example 1

Production of Acrylic Polymer

To a four-neck flask equipped with a stirring blade, a thermometer, a nitrogen gas introducing tube, and a condenser were added 80.1 parts of butyl acrylate, 19 parts of phenoxyethyl acrylate, 0.1 part of N,N-dimethylaminoethyl acrylate, 0.3 part of acrylic acid, 0.5 part of 4-hydroxybutyl acrylate, and 0.1 part of 2,2'-azobisisobutyronitrile as a polymerization initiator, with 200 parts of ethyl acetate. Nitrogen gas was introduced to replace the air, while the mixture was gently stirred, and then a polymerization reaction was performed for 6 hours, while the temperature of the liquid in the flask was kept at about 55° C., so that a solution of an acrylic polymer was prepared. After the polymerization was completed, ethyl acetate was added to provide a solids content of 13% so that an acrylic polymer solution was prepared.

Production Examples 2 to 29

Acrylic polymer solutions were prepared using the process of Production Example 1, except that at least one of the type and the amount of the monomer components was changed as shown in Table 1. The weight average molecular weight, the degree of dispersion, and the refractive index of the acrylic polymer obtained in each example are shown in Table 1.

Example 1

Production of Pressure-Sensitive Adhesive Layer-Carrying Polarizing Plate

Based on 100 parts of the solids of the acrylic polymer solution obtained in Production Example 1, 0.35 parts of polyol-modified hexamethylene diisocyanate (D160N manufactured by Mitsui Takeda Polyurethane Inc.) as a crosslinking agent and 0.2 part of a silane coupling agent (KBM573 manufactured by Shin-Etsu Chemical Co., Ltd.) were added to the acrylic polymer solution so that an acrylic pressure-sensitive adhesive solution was prepared.

The acrylic pressure-sensitive adhesive solution was then applied to one side of a silicone-treated polyethylene terephthalate (PET) film (MRF38 manufactured by Mitsubishi Polyester Film Corporation) so as to provide a pressure-sensitive adhesive layer with a thickness of 20 μm after drying. The acrylic pressure-sensitive adhesive solution was then dried at 155° C. for 2 minutes to form a pressure-sensitive adhesive layer. The pressure-sensitive adhesive layer was transferred and bonded to the polarizing plate so that a pressure-sensitive adhesive layer-carrying polarizing plate was prepared.

Examples 2 to 27 and Comparative Examples 1 to 12

Pressure-sensitive adhesive layer-carrying polarizing plates were prepared using the process of Example 1, except that the type or the amount of the acrylic polymer solution, the type or the amount of the crosslinking agent, or the type or the amount of the silane coupling agent for the preparation of the acrylic pressure-sensitive adhesive solution was changed as shown in Table 2.

The pressure-sensitive adhesive layer-carrying polarizing plate (sample) obtained in each of the examples and the comparative examples was evaluated as described below. The results of the evaluation are shown in Table 2.

Measurement of Initial Adhesive Force

The sample was cut into 25 mm-wide pieces (120 m in length). Each sample piece was then press-bonded to a 0.7 mm-thick alkali-free glass plate (1737 manufactured by Corning Incorporated) by one reciprocation of a 2 kg roller and then aged at 23° C. for 1 hour. The sample piece was peeled from the glass plate at a peel angle of 90° and a peel rate of 300 mm/minute with a tensile tester (Autograph SHIMAZU AG-110KN), when the adhesive force (N/25 mm, 80 m in length during the measurement) was measured. In the measurement, sampling was performed at an interval of 0.5 seconds for one measurement, and the average was used as the measured value.

Measurement of Adhesive Force after 48 Hours at 60° C.

The sample was cut into 25 mm-wide pieces. Each sample piece was then press-bonded to a 0.7 mm-thick alkali-free glass plate (1737 manufactured by Corning Incorporated) by one reciprocation of a 2 kg roller and then aged at 23° C. for 1 hour. The sample piece was then dried at 60° C. for 48 hours. The sample piece was then peeled from the glass plate at a peel angle of 90° and a peel rate of 300 mm/minute with the same tensile tester, when the adhesive force (N/25 mm) was measured.

Reworkability

The sample was cut into 420 mm long×320 mm wide pieces. The sample piece was attached with a laminator to a 0.7 mm-thick alkali-free glass plate (1737 manufactured by Corning Incorporated) and then subjected to an autoclave treatment at 50° C. and 5 atm for 15 minutes to be completely bonded. The sample piece was then heat-treated under dry conditions at 60° C. for 48 hours. The sample piece (the pressure-sensitive adhesive polarizing plate) was then peeled by hand from the alkali-free glass plate, and the reworkability was evaluated according to the criteria described below. In the evaluation of the reworkability, three sample pieces were prepared by the procedure described above, and the peeling process was repeated three times. The evaluation criteria were as shown below.

⊚: Three sample pieces were all successfully peeled with no adhesive residue or no film rupture.

○: Film rupture occurred in part of the three sample pieces, but it was successfully peeled by re-peeling.

Δ: Film rupture occurred in all the three sample pieces, but each film was successfully peeled by re-peeling.

x: In all the three laminates, some adhesive residue was left, or films were ruptured and were not successfully separated every time peeling was performed.

As used herein, the term "adhesive residue" means the state in which the pressure-sensitive adhesive undergoes cohesive fracture (parting) in a bulk state so that the adhesive is clearly left on the polarizing plate side and the glass side.

Measurement of Gel Fraction

The gel fraction was evaluated using the pressure-sensitive adhesive composition obtained before the preparation of the sample of each of the examples and the comparative examples. Each composition was applied to a release-treated polyester film so that it would have a thickness of 25 μm after drying. The gel fraction of each composition was measured 1 hour after the application and 1 week after the application. The gel fraction was measured as described below. After the application, the pressure-sensitive adhesive was allowed to stand on the support at a temperature of 23° C. and a humidity of 65% RH. Thereafter, 0.2 g of the pressure-sensitive adhesive was sampled and wrapped in a fluororesin (TEMISH NTF-1122 manufactured by Nitto Denko Corporation) (Wa) whose weight was measured in advance. After the fluororesin was bound so that the pressure-sensitive adhesive did not leak, the weight (Wb) of the wrapped product was measured, and it was placed in a sample vial. To the vial was added 40 ml of ethyl acetate. The product was then allowed to stand for 1 hour or 7 days. The fluororesin-wrapped pressure-sensitive adhesive was then taken out, placed on an aluminum cup, and dried at 130° C. for 2 hours. The weight (Wc) of fluororesin with the sample was measured. The gel fraction was calculated according to formula (I): gel fraction $\{(Wc-Wa)/(Wb-Wa)\}\times 100$=(% by weight)

Measurement of Holding Power

The holding power (H) was measured as described below. The prepared sample was allowed to stand at 23° C. for 1 week. An upper part (10 mm×10 mm) of the pressure-sensitive adhesive optical film (10 mm×30 mm) was attached to a Bakelite board through the pressure-sensitive adhesive layer. It was then autoclaved under the conditions of 50° C. and 5 atm for 15 minutes and allowed to stand at room temperature for 1 hour. A load of 500 g was then applied to the lower end of the pressure-sensitive adhesive optical film. After standing for 1 hour, the holding power was determined as the length of displacement of the pressure-sensitive adhesive optical film and the Bakelite board before and after the application of the load.

Measurement of Refractive Index

The refractive index of the resulting (meth)acrylic polymer was measured with a multi-wavelength Abbe refractometer DR-M2 (manufactured by Atago Co., Ltd.) (measurement light source: sodium lamp (589.3 nm); measurement conditions: 23° C. and 65% RH). The acrylic pressure-sensitive adhesive solution was applied to one side of a silicone-treated polyethylene terephthalate (PET) film and dried to form a pressure-sensitive adhesive layer. The pressure-sensitive adhesive layer was laminated four times on the PET film to form a 100 μm-thick laminate which was used as a sample for the measurement.

Surface Staining

The 25 mm sample obtained in each of the examples and the comparative examples was bonded to an alkali-free glass plate (1737 manufactured by Corning Incorporated) by one reciprocation of a 2 kg roller and then aged at 23° C. for 1 hour. After the sample was peeled from the glass plate at a peel angle of 90° and a peel rate of 30 mm/minute, the surface of the glass plate was visually observed for the degree of staining, based on the evaluation criteria below.

○: No staining was observed on the glass surface.

Δ: Staining was observed on part of the glass surface.

x: Staining was observed over the glass surface.

Punching Quality

Within 24 hours after the sample was prepared, 100 square pieces each with a side of 270 mm were obtained from the sample by punching. The operator evaluated the 100 pieces by visual observation and by touching with the hand with respect to whether or not the surface of the polarizing plate side had a sticky feeling or whether or not the surface of the polarizing plate was stained with the pressure-sensitive adhesive. How many pieces had a sticky feeling or a stain was determined, and evaluation was performed according to the criteria below.

○: None of the 100 pieces had a sticky feeling or a stain.

Δ: One to five of the 100 pieces had a sticky feeling or a stain.

x: Six or more of the 100 pieces had a sticky feeling or a stain.

Number of Generation of Dents

Within 24 hours after the sample was prepared, 100 square pieces each with a side of 270 mm were obtained from the sample by punching. The 100 pieces were laminated in the same direction such that the polarizing plates were placed on the upper side. The laminate was allowed to stand at a temperature of 25° C. and a humidity of 55% for 1 week. Whether or not any dent was formed and the number of dents was then determined visually.

⊚: None of the 100 pieces had any dent.

○: One to five of the 100 pieces had a dent or dents.

x: Six or more of the 100 pieced had a dent or dents.

Durability

The sample was cut into 420 mm long×320 mm wide pieces. The sample pieces were bonded to both sides of a 0.7 mm-thick alkali-free glass plate (1737 manufactured by Corning Incorporated) in the crossed Nicols arrangement with a laminator. The sample pieces were then autoclaved at 50° C. and 5 atm for 15 minutes so that they were completely bonded to the alkali-free glass plate. After this process, the sample pieces were subjected to a process for 500 hours at 80°

C., 90° C., 100° C., or 60° C./90% RH, and then foaming, peeling or separation was visually evaluated according to the criteria below.

⊙: Neither foaming, peeling, nor separation was observed.
○: Foaming (with a maximum size of less than 100 μm) was observed with no effect on visibility.
Δ: There were lots of foams (with a maximum size of less than 100 μm) with no effect on visibility.
×: Foaming (with a maximum size of 100 μm or more) or separation was observed.

Measurement of Light Leakage

The pressure-sensitive adhesive layer obtained in each of the examples and the comparative examples was transferred and bonded to a 400 mm wide×700 mm long polarizing plate (NPF-SIG5423DU manufactured by Nitto Denko Corporation) to form a pressure-sensitive adhesive layer-carrying polarizing plate A (in which the absorption axis was parallel to the long side of the polarizing plate). The pressure-sensitive adhesive layer obtained in each of the examples and the comparative examples was also transferred and bonded to a 700 mm long×400 mm wide polarizing plate (NPF-SIG5423DU manufactured by Nitto Denko Corporation) to form a pressure-sensitive adhesive layer-carrying polarizing plate B (in which the absorption axis was parallel to the short side of the polarizing plate). The polarizing plates A and B were bonded to both sides of a 0.7 mm-thick alkali-free glass plate in the crossed Nicols arrangement and then autoclaved at 50° C. and 5 atm for 15 minutes so that they were completely bonded to the alkali-free glass plate. The resulting sample was stored at 80° C. for 500 hours and then placed on a 10,000 candela backlight. The light leakage from the sample was visually checked according to the criteria below.

⊙: No light leakage was observed, and there was no practical problem.
○: Light leakage was slightly observed, but there was no practical problem.
Δ: Light leakage was observed, but there was no practical problem.
×: Light leakage was significantly observed, and there was a practical problem.

Method for Evaluation of Pot Life

The acrylic pressure-sensitive adhesive solution obtained in each of the examples and the comparative examples was allowed to stand at a temperature of 23° C. and a humidity of 65% RH, while time was checked from the preparation of the acrylic pressure-sensitive adhesive solution to the development of an increase in its viscosity. The check was made after each sample was allowed to stand at a temperature of 23° C. and a humidity of 65% RH for 6, 9, or 12 hours.

⊙: No increase in viscosity was observed after 12 hours, and there was no practical problem.
○: An increase in viscosity was observed after 12 hours, but there was no practical problem.
Δ: An increase in viscosity was observed after 9 hours, but there was no practical problem.
×: An increase in viscosity was observed after 6 hours, and there was a practical problem.

TABLE 1

| | Monomer Components | | | | | | | | | | | |
|---|---|---|---|---|---|---|---|---|---|---|---|---|
| | Alkyl (Meth)-acrylate | Aromatic Ring-Containing | | Tertiary Amino Group-Containing Monomer | | Nitrogen-Containing Monomer Other Than Tertiary Amino Group-Containing Monomer | | Carboxyl Group-Containing Monomer | Hydroxyl Group-Containing Monomer | | Weight Average Molecular Weight | Degree of Dispersion | Refractive Index |
| | BA (parts) | PEA (parts) | BZA (parts) | DMAEA (parts) | DMAPAA (parts) | AAM (parts) | ACMO (parts) | AA (parts) | 4HBA (parts) | 2HEA (parts) | (×10⁴) $M_w$ | $M_w/M_n$ | |
| Production Example 1 | 80.1 | 19.0 | — | 0.1 | — | — | — | 0.3 | 0.5 | — | 205 | 3.01 | 1.484 |
| Production Example 2 | 80.0 | 19.0 | — | 0.3 | — | — | — | 0.3 | 0.5 | — | 200 | 3.23 | 1.484 |
| Production Example 3 | 79.8 | 19.0 | — | 0.5 | — | — | — | 0.3 | 0.5 | — | 201 | 4.01 | 1.484 |
| Production Example 4 | 80.1 | 19.0 | — | — | 0.1 | — | — | 0.3 | 0.5 | — | 200 | 3.53 | 1.484 |
| Production Example 5 | 79.4 | 19.0 | — | 0.1 | — | — | — | 1.0 | 0.5 | — | 234 | 3.33 | 1.484 |
| Production Example 6 | 79.6 | 19.0 | — | 0.1 | — | — | — | 0.3 | 1.0 | — | 204 | 3.09 | 1.484 |
| Production Example 7 | 78.9 | 19.0 | — | 0.1 | — | — | — | 1.0 | 1.0 | — | 242 | 3.45 | 1.484 |
| Production Example 8 | 80.1 | 19.0 | — | 0.1 | — | — | — | 0.3 | — | 0.5 | 200 | 3.66 | 1.484 |
| Production Example 9 | 75.6 | 19.0 | — | 0.5 | — | — | — | 3.0 | 2.0 | — | 236 | 2.99 | 1.484 |
| Production Example 10 | 80.1 | 19.0 | — | 0.1 | — | — | — | 0.3 | 0.5 | — | 162 | 4.33 | 1.484 |
| Production Example 11 | 80.1 | 19.0 | — | 0.1 | — | — | — | 0.3 | 0.5 | — | 295 | 3.21 | 1.484 |
| Production Example 12 | 80.1 | 19.0 | — | 0.1 | — | — | — | 0.3 | 0.5 | — | 162 | 12.50 | 1.484 |
| Production Example 13 | 89.1 | 10.0 | — | 0.1 | — | — | — | 0.3 | 0.5 | — | 220 | 3.68 | 1.476 |
| Production Example 14 | 79.1 | 10.0 | 10.0 | 0.1 | — | — | — | 0.3 | 0.5 | — | 232 | 3.22 | 1.485 |

TABLE 1-continued

| | Monomer Components | | | | | | | | | | | |
|---|---|---|---|---|---|---|---|---|---|---|---|---|
| | Alkyl (Meth)-acrylate | Aromatic Ring-Containing | | Tertiary Amino Group-Containing Monomer | | Nitrogen-Containing Monomer Other Than Tertiary Amino Group-Containing Monomer | | Carboxyl Group-Containing Monomer | Hydroxyl Group-Containing Monomer | | Weight Average Molecular Weight | Degree of Dispersion | Refractive Index |
| | BA (parts) | PEA (parts) | BZA (parts) | DMAEA (parts) | DMAPAA (parts) | AAM (parts) | ACMO (parts) | AA (parts) | 4HBA (parts) | 2HEA (parts) | (×10⁴) $M_w$ | $M_w/M_n$ | |
| Production Example 15 | 64.1 | 19.0 | 16.0 | 0.1 | — | | — | 0.3 | 0.5 | — | 212 | 3.89 | 1.498 |
| Production Example 16 | 66.1 | | 33.0 | 0.1 | — | — | — | 0.3 | 0.5 | — | 215 | 4.01 | 1.498 |
| Production Example 17 | 99.1 | | | 0.1 | — | — | — | 0.3 | 0.5 | — | 208 | 3.03 | 1.468 |
| Production Example 18 | 44.1 | 55.0 | | 0.1 | — | — | — | 0.3 | 0.5 | — | 256 | 3.81 | 1.515 |
| Production Example 19 | 80.0 | 19.0 | | — | — | — | — | — | 1.0 | — | 222 | 2.91 | 1.484 |
| Production Example 20 | 80.2 | 19.0 | | — | — | — | — | 0.3 | 0.5 | — | 200 | 4.01 | 1.484 |
| Production Example 21 | 80.4 | 19.0 | | 0.1 | | | | | 0.5 | — | 211 | 4.23 | 1.484 |
| Production Example 22 | 79.2 | 19.0 | | 1.0 | | | | 0.3 | 0.5 | | 204 | 4.52 | 1.484 |
| Production Example 23 | 97.0 | | | | | 2.5 | | | 0.5 | | 120 | 20.40 | 1.468 |
| Production Example 24 | 78.0 | 19.0 | | | | 2.5 | | | 0.5 | | 133 | 22.70 | 1.484 |
| Production Example 25 | 59.4 | 19.0 | 18.0 | | | | | 0.1 | | 3.5 | 121 | 28.80 | 1.499 |
| Production Example 26 | 77.3 | 19.0 | | 0.2 | | | | | | 3.5 | 125 | 31.10 | 1.484 |
| Production Example 27 | 73.0 | 19.0 | | | | | 5.0 | 2.9 | | 0.1 | 178 | 3.31 | 1.484 |
| Production Example 28 | 73.1 | | 26.0 | 0.1 | | | | 0.3 | 0.5 | | 251 | 2.89 | 1.490 |
| Production Example 29 | 73.0 | | 26.0 | 0.05 | | | | | 1.0 | | 221 | 2.55 | 1.490 |

In Table 1, BA represents butyl acrylate, DMAEA N,N-dimethylaminoethyl acrylate, DMAPAA N,N-dimethylaminopropylacrylamide, ACMO N-acryloylmorpholine, AAM acrylamide, AA acrylic acid, 4HBA 4-hydroxybutyl acrylate, 2HEA 2-hydroxyethyl acrylate, PEA phenoxyethyl acrylate, and BZA benzyl acrylate.

TABLE 2

| | Acrylic Polymer Type | Type and Amount (parts) of Isocyanate Crosslinking Agent | | Type and Amount (parts) of Silane Coupling Agent | | Additional Components | Evaluations | | | | Reworkability (Staining) | Pot Life | Light Leakage |
|---|---|---|---|---|---|---|---|---|---|---|---|---|---|
| | | | | | | | Reworkability (Adhesion)(N/25 mm) | | | | | | |
| | | | | | | | Initial | | After 48 hours at 60° C. | | | | |
| | | Type | Parts | KBM573 | KBM403 | | | | | | | | |
| Example 1 | Production Example 1 | D160N | 0.35 | 0.2 | | | ⊙ | 3.8 | ⊙ | 5.7 | ○ | ⊙ | ⊙ |
| Example 2 | Production Example 2 | D160N | 0.35 | 0.2 | | | ⊙ | 4.1 | ⊙ | 6.3 | ○ | ⊙ | ⊙ |
| Example 3 | Production Example 3 | D160N | 0.35 | 0.2 | | | ⊙ | 4.9 | ⊙ | 8.9 | ○ | ⊙ | ⊙ |
| Example 4 | Production Example 4 | D160N | 0.35 | 0.2 | | | ⊙ | 3.9 | ⊙ | 5.8 | ○ | ⊙ | ⊙ |
| Example 5 | Production Example 5 | D160N | 0.35 | 0.2 | | | ○ | 7.5 | ○ | 10.9 | ○ | ○ | ⊙ |
| Example 6 | Production Example 6 | D160N | 0.35 | 0.2 | | | ○ | 7.6 | ○ | 10.5 | ○ | ○ | ⊙ |
| Example 7 | Production Example 7 | D160N | 0.35 | 0.2 | | | ○ | 8.2 | ○ | 11.9 | ○ | ○ | ⊙ |

TABLE 2-continued

| | | | | | | | | | | | | | |
|---|---|---|---|---|---|---|---|---|---|---|---|---|---|
| Example 8 | Production Example 8 | D160N | 0.35 | 0.2 | | | ⊙ | 4.9 | ⊙ | 9.8 | ○ | ⊙ | ⊙ |
| Example 9 | Production Example 9 | D160N | 0.35 | 0.2 | | | Δ | 9.2 | Δ | 14.1 | ○ | Δ | ⊙ |
| Example 10 | Production Example 10 | D160N | 0.35 | 0.2 | | | ⊙ | 7.7 | ○ | 11.2 | ○ | ⊙ | ⊙ |
| Example 11 | Production Example 11 | D160N | 0.35 | 0.2 | | | ⊙ | 3.1 | ⊙ | 5.2 | ○ | ⊙ | ⊙ |
| Example 12 | Production Example 12 | D160N | 0.35 | 0.2 | | | Δ | 8.7 | Δ | 13.6 | Δ | ⊙ | Δ |
| Example 13 | Production Example 13 | D160N | 0.35 | 0.2 | | | ⊙ | 4.2 | ⊙ | 6.0 | ○ | ⊙ | ○ |
| Example 14 | Production Example 1 | D160N | 0.35 | 0.2 | | | ⊙ | 3.5 | ⊙ | 5.3 | Δ | ⊙ | ⊙ |
| Example 15 | Production Example 1 | C/L | 0.35 | 0.2 | | | ⊙ | 3.3 | ⊙ | 5.4 | ○ | ⊙ | ⊙ |
| Example 16 | Production Example 1 | D110N | 0.35 | 0.2 | | | ⊙ | 3.9 | ⊙ | 5.5 | ○ | Δ | ⊙ |
| Example 17 | Production Example 1 | D140N | 0.35 | 0.2 | | | ⊙ | 4.1 | ⊙ | 5.7 | ○ | ⊙ | ⊙ |
| Example 18 | Production Example 1 | D120N | 0.35 | 0.2 | | | ⊙ | 4.2 | ⊙ | 5.9 | ○ | ⊙ | ⊙ |
| Example 19 | Production Example 1 | D127N | 0.35 | 0.2 | | | ⊙ | 3.8 | ⊙ | 6.2 | ○ | ⊙ | ⊙ |
| Example 20 | Production Example 14 | D160N | 0.35 | 0.2 | | | ⊙ | 4.0 | ⊙ | 6.3 | ○ | ⊙ | ⊙ |
| Example 21 | Production Example 15 | D160N | 0.35 | 0.2 | | | ○ | 8.1 | ○ | 11.1 | ○ | ⊙ | Δ |
| Example 22 | Production Example 16 | D160N | 0.35 | 0.2 | | | ○ | 7.4 | ○ | 11.5 | ○ | ⊙ | Δ |
| Example 23 | Production Example 1 | D160N | 0.35 | | 0.2 | | ⊙ | 5.3 | ○ | 11.5 | ○ | ⊙ | ⊙ |
| Example 24 | Production Example 28 | D160N | 0.35 | 0.2 | | | ⊙ | 3.4 | ⊙ | 8.9 | ○ | ⊙ | ⊙ |
| Example 25 | Production Example 28 | D160N | 0.35 | | | 0.2(KBM5103) | ⊙ | 2.8 | ⊙ | 9.4 | ○ | ⊙ | ⊙ |
| Example 26 | Production Example 29 | C/L | 0.35 | | | 0.2(A100) | ⊙ | 5.8 | ⊙ | 8.0 | ○ | ⊙ | ⊙ |
| Example 27 | Production Example 21 | D160N | 0.35 | 0.2 | | | ⊙ | 5.1 | ⊙ | 7.5 | ○ | ⊙ | ⊙ |
| Comparative Example 1 | Production Example 17 | D160N | 0.35 | 0.2 | 0.2 | | ⊙ | 3.9 | ⊙ | 5.8 | ○ | ⊙ | X |
| Comparative Example 2 | Production Example 18 | D160N | 0.35 | 0.2 | 0.2 | | ○ | 8.9 | Δ | 14.5 | ○ | ⊙ | X |
| Comparative Example 3 | Production Example 19 | D160N | 0.35 | 0.2 | 0.2 | | ○ | 8.0 | X | 22.4 | ○ | ⊙ | ⊙ |
| Comparative Example 4 | Production Example 20 | D160N | 0.35 | 0.2 | 0.2 | | ○ | 8.5 | X | 20.5 | ○ | ⊙ | ⊙ |
| Comparative Example 5 | Production Example 22 | D160N | 0.35 | 0.2 | 0.2 | | ○ | 8.1 | X | 19.6 | ○ | ⊙ | ⊙ |
| Comparative Example 6 | Production Example 23 | D110N | 0.35 | 0.2 | 0.2 | | X | 12.5 | X | 26.5 | Δ | Δ | X |
| Comparative Example 7 | Production Example 24 | D110N | 0.35 | 0.2 | 0.2 | | X | 13.5 | X | 23.5 | Δ | Δ | Δ |
| Comparative Example 8 | Production Example 25 | D110N | 0.35 | 0.2 | 0.2 | | X | 12.1 | X | 27.8 | Δ | Δ | Δ |
| Comparative Example 9 | Production Example 26 | D110N | 0.35 | 0.2 | 0.2 | | X | 13.3 | X | 25.5 | Δ | Δ | Δ |
| Comparative Example 10 | Production Example 27 | D160N | 0.35 | 0.2 | 0.2 | | X | 14.2 | X | 25.9 | ○ | Δ | ⊙ |
| Comparative Example 11 | Production Example 1 | D160N | 0.35 | 0.2 | 0.2 | *oligomer | ⊙ | 3.9 | X | 15.9 | X | ⊙ | Δ |
| Comparative Example 12 | Production Example 1 | D160N | 0.35 | | | | ⊙ | 3.5 | ⊙ | 6.7 | ○ | ⊙ | ⊙ |

| | | | Evaluations | | | | |
|---|---|---|---|---|---|---|---|
| | | | Processability | | Durability | | |
| | Gel Fraction after 1 Hour | Gel Fraction after 1 Week | Number of Generation of Dents | Punching Quality | 80° C. | 90° C. | 100° C. | 60° C./ 90% RH |
| Example 1 | 82.1 | 84.5 | ⊙ | ○ | ⊙ | ⊙ | ⊙ | ⊙ |
| Example 2 | 83.2 | 83.3 | ⊙ | ○ | ⊙ | ⊙ | ⊙ | ⊙ |
| Example 3 | 82.9 | 85.5 | ⊙ | ○ | ⊙ | ⊙ | ⊙ | ⊙ |
| Example 4 | 85.5 | 85.4 | ⊙ | ○ | ⊙ | ⊙ | ⊙ | ⊙ |
| Example 5 | 80.2 | 85.2 | ⊙ | ○ | ⊙ | ⊙ | ⊙ | ⊙ |

TABLE 2-continued

| | | | | | | | | |
|---|---|---|---|---|---|---|---|---|
| Example 6 | 82.2 | 88.6 | ⊙ | ○ | ⊙ | ⊙ | ⊙ | ⊙ |
| Example 7 | 83.9 | 88.5 | ⊙ | ○ | ⊙ | ⊙ | ⊙ | ⊙ |
| Example 8 | 86.7 | 87.2 | ⊙ | ○ | ⊙ | ⊙ | ⊙ | ⊙ |
| Example 9 | 82.7 | 83.4 | ⊙ | ○ | ⊙ | ⊙ | ⊙ | ⊙ |
| Example 10 | 89.1 | 88.8 | ⊙ | ○ | ⊙ | ○ | ○ | ⊙ |
| Example 11 | 79.9 | 80.1 | ⊙ | ○ | ⊙ | ⊙ | ⊙ | ○ |
| Example 12 | 87.5 | 86.9 | ○ | Δ | ⊙ | Δ | Δ | ⊙ |
| Example 13 | 82.1 | 83.1 | ⊙ | ○ | ⊙ | ⊙ | ⊙ | ⊙ |
| Example 14 | 89.0 | 89.9 | ⊙ | ○ | ⊙ | ○ | Δ | ⊙ |
| Example 15 | 71.2 | 85.1 | ⊙ | ○ | ⊙ | ⊙ | ○ | ⊙ |
| Example 16 | 90.0 | 92.1 | ⊙ | ○ | ⊙ | ⊙ | ○ | ⊙ |
| Example 17 | 55.2 | 79.1 | Δ | Δ | ⊙ | ⊙ | ○ | ⊙ |
| Example 18 | 60.9 | 80.3 | ○ | Δ | ⊙ | ⊙ | ○ | ⊙ |
| Example 19 | 66.1 | 82.1 | ○ | Δ | ⊙ | ⊙ | ○ | ⊙ |
| Example 20 | 83.1 | 86.5 | ⊙ | ○ | ⊙ | ⊙ | ⊙ | ⊙ |
| Example 21 | 82.0 | 83.6 | ⊙ | ○ | ⊙ | ⊙ | ⊙ | ⊙ |
| Example 22 | 81.1 | 84.4 | ⊙ | ○ | ⊙ | ⊙ | ⊙ | ⊙ |
| Example 23 | 83.3 | 84.0 | ⊙ | ○ | ⊙ | ⊙ | ⊙ | ⊙ |
| Example 24 | 84.5 | 86.3 | ⊙ | ○ | ⊙ | ⊙ | ⊙ | ⊙ |
| Example 25 | 85.5 | 89.9 | ⊙ | ○ | ⊙ | ⊙ | ⊙ | ⊙ |
| Example 26 | 72.0 | 85.1 | ⊙ | ○ | ⊙ | ⊙ | ⊙ | ⊙ |
| Example 27 | 55.7 | 82.9 | Δ | Δ | ⊙ | ○ | Δ | ⊙ |
| Comparative Example 1 | 83.1 | 85.1 | ⊙ | ○ | ⊙ | ⊙ | ⊙ | ⊙ |
| Comparative Example 2 | 85.0 | 84.2 | ⊙ | ○ | ⊙ | ⊙ | ⊙ | ⊙ |
| Comparative Example 3 | 12.3 | 80.1 | X | X | ⊙ | Δ | X | ○ |
| Comparative Example 4 | 65.5 | 87.1 | ○ | ○ | ⊙ | ○ | ○ | ⊙ |
| Comparative Example 5 | 82.1 | 83.8 | ⊙ | ○ | ⊙ | ⊙ | ⊙ | ⊙ |
| Comparative Example 6 | 48.1 | 79.7 | X | X | ⊙ | Δ | X | ⊙ |
| Comparative Example 7 | 45.3 | 76.5 | X | X | ⊙ | Δ | X | ⊙ |
| Comparative Example 8 | 66.9 | 80.1 | ○ | X | ⊙ | Δ | X | ⊙ |
| Comparative Example 9 | 57.1 | 75.9 | Δ | X | ⊙ | Δ | X | ⊙ |
| Comparative Example 10 | 83.1 | 89.8 | ⊙ | ○ | ⊙ | ⊙ | ⊙ | ⊙ |
| Comparative Example 11 | 72.1 | 82.1 | Δ | Δ | ○ | Δ | X | ○ |
| Comparative Example 12 | 80.0 | 81.2 | ⊙ | ○ | ⊙ | X | X | X |

In Table 2, the isocyanate crosslinking agents include polyol-modified hexamethylene diisocyanate (D160N manufactured by Mitsui Takeda Polyurethane Inc.), polyol-modified hydrogenated xylylene diisocyanate (D120N manufactured by Mitsui Takeda Polyurethane Inc.), polyol-modified isophorone diisocyanate (D140N manufactured by Mitsui Takeda Polyurethane Inc.), trimer type hydrogenated xylylene diisocyanate (D127N manufactured by Mitsui Takeda Polyurethane Inc.), polyol-modified tolylene diisocyanate (C/L manufactured by Nippon Polyurethane Industry Co., Ltd.), and polyol-modified xylylene diisocyanate (D110N manufactured by Mitsui Takeda Polyurethane Inc.); the silane coupling agent is KBM573, KBM403, or KBM5103 manufactured by Shin-Etsu Chemical Co., Ltd., or A-100 manufactured by Soken Chemical & Engineering Co., Ltd.; and *oligomer as an additional component in Comparative Example 12 is 15 parts of an acrylic oligomer (AR-FONUP-1000, 3,000 in weight average molecular weight, manufactured by Toagosei Co., Ltd.).

What is claimed is:

1. A pressure-sensitive adhesive composition for an optical film, comprising:
   a (meth)acrylic polymer comprising (a) 34 to 94% by weight of an alkyl(meth)acrylate monomer unit, (b) 5 to 35% by weight of an aromatic ring-containing (meth)acrylate monomer unit, and (c) 0.01 to 0.5% by weight of an amino group-containing (meth)acrylate monomer unit, and further comprising (d) 0.05 to 3% by weight of a carboxyl group-containing (meth)acrylate monomer unit and/or (e) 0.05 to 2% by weight of a hydroxyl group-containing (meth)acrylate monomer unit and having a weight average molecular weight of 1,800,000 to 2,800,000 as determined by gel permeation chromatography;
   crosslinking agents comprising 0.01 to 5 parts by weight of an isocyanate crosslinking agent and 0.01 to 2 parts by weight of a silane coupling agent based on 100 parts by weight of the (meth)acrylic polymer.

2. The pressure-sensitive adhesive composition according to claim 1, wherein the (meth)acrylic polymer has a degree of dispersion (Mw/Mn) of 1 to 10.

3. The pressure-sensitive adhesive composition according to claim 1, wherein the amino group-containing (meth)acrylate is a tertiary amino group-containing (meth)acrylate.

4. The pressure-sensitive adhesive composition according to claim 1, wherein the isocyanate crosslinking agent is a polyisocyanate compound derived from hexamethylene diisocyanate.

5. The pressure-sensitive adhesive composition according to claim 1, wherein the silane coupling agent has an acetoacetyl group or an amino group.

6. The pressure-sensitive adhesive composition according to claim 1, wherein the aromatic ring-containing (meth)acrylate is at least one selected from the group consisting of phenoxyethyl(meth)acrylate and benzyl(meth)acrylate.

7. The pressure-sensitive adhesive composition according to claim 6, wherein the phenoxyethyl(meth)acrylate makes up 5 to 20% by weight of all the monomers constituting the (meth)acrylic polymer.

\* \* \* \* \*